Jan. 9, 1923.
H. A. AMES.
DRIVING JOINT FOR SPEEDOMETERS.
FILED OCT. 12, 1922.
1,441,473
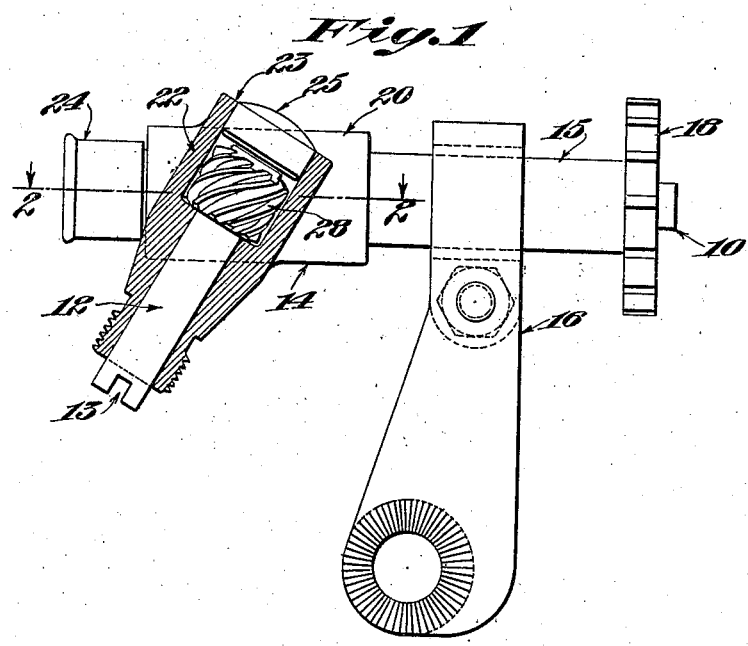
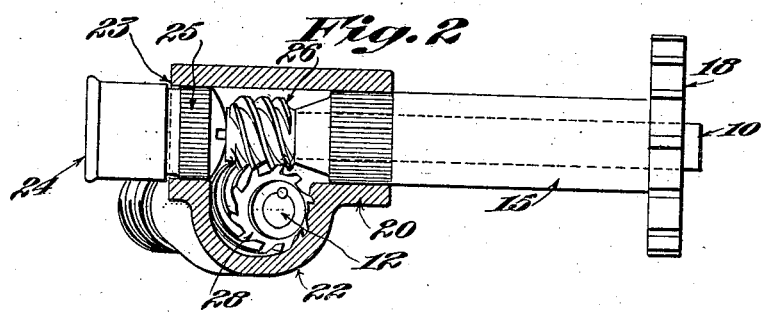

Patented Jan. 9, 1923.

1,441,473

UNITED STATES PATENT OFFICE.

HENRY A. AMES, OF MILTON, MASSACHUSETTS, ASSIGNOR TO STANDARD THERMOMETER COMPANY, OF PORTLAND, MAINE, A CORPORATION OF MAINE.

DRIVING JOINT FOR SPEEDOMETERS.

Application filed October 12, 1922. Serial No. 594,130.

*To all whom it may concern:*

Be it known that I, HENRY A. AMES, a citizen of the United States, residing at Milton, in the county of Norfolk and State of Massachusetts, have invented certain new and useful Improvements in Driving Joints for Speedometers; and I do hereby declare the following to be a full, clear, and exact description of the invention, such as will enable others skilled in the art to which it appertains to make and use the same.

This invention relates to a driving joint for speedometers.

The object of the invention is to provide a driving joint for speedometers of novel and durable construction which may be manufactured economically and which is adapted for use in connection with the different types of speedometers at present upon the market.

With this general object in view, the invention consists in the driving joint for speedometers hereinafter described and particularly defined in the claims.

In the drawings illustrating the preferred embodiment of the invention, Figure 1 is a plan view, partly in section, of the improved joint; and Fig. 2 is a sectional view of the same on the line 2—2 of Fig. 1.

The speedometers used in connection with motor vehicles are driven from a rotating part of the vehicle, usually one of the front wheels, by means of a ring gear upon the front wheel and pinion cooperating therewith, and thence through connections including a driving joint and flexible shaft to the speed indicating and distance recording mechanism of the speedometer, the latter positioned upon the cowl or dash of the vehicle. Some types of speedometers require that their main driving shaft be rotated in a single direction for their operation. Other types may be successfully driven whether their driving shaft is rotated clockwise or anti-clockwise. In the driving joints heretofore employed for transmitting the rotations of the pinion, in a manner such that the driving of the speedometer shaft and pinion are both caused to rotate in the same direction, various combinations of intermediate gears and counter shafts have been employed for producing the desired directional relation between the two shafts. The use of such a gear train has necessitated a driving joint of more or less elaborate construction, expensive to manufacture and which has proven in practice incapable of successfully withstanding the severe jolts and strains incident to road driving.

In the construction of a speedometer driving joint which will be capable of universal use with the different types of speedometers on the market and also such as to enable it at the same time to withstand severe road service, certain conditions are encountered which complicate the maintenance of the desired directional relation between the pinion and the main driving shaft of the speedometer. For example, the driving joint includes, of necessity, one shaft secured to the axle or other fixed part of the frame of the vehicle in a position such that the pinion thereon will mesh with the ring gear upon the front wheel of the vehicle. The mechanism for transmitting the rotations of this pinion to the flexible shaft of the speedometer, must be such as to afford an angular connection with such flexible shaft. Swivel joints have been attempted but the wear under road service is such as to render a more rigid construction desirable. In practice, for successful operation, the angular connection should be in the neighborhood of 120 degrees, reasonable variations therefrom not affecting the successful operation of the joint to an appreciable extent. In accordance with the present invention, the desired rigidity and durability, as well as the desired directional relation, is secured by a driving joint comprising two shafts, one provided with a pinion for engagement with the ring gear upon the vehicle wheel, and the other with suitable connection to the flexible driving shaft of the speedometer. The shafts are arranged at an angle of approximately 120 degrees with relation to one another, each being journaled in bearings rigid in a single unitary housing. The shafts are connected by a single pair of cooperating oblique worm gears within the housing, one upon each shaft. The worm gears are specially designed in accordance with the angular relation of the two shafts to produce rotation of both in the same direction. In this manner a simple yet practical construction of driving joint is secured.

In the illustrated embodiment of the invention, the two shafts are shown at 10 and 12, extending into and journaled in bearings in a unitary housing 14, preferably comprising a single casting. The tubular member 15 supports and forms the bearing for the shaft 10, being received in an opening in the housing 14 and secured therein by a drive fit. The housing 14 is adapted to be secured by the clip bracket 16, which clamps the tubular member to the axle or frame of the vehicle in the usual manner. One shaft 10 is provided with a pinion 18 secured thereon which is adapted to engage and mesh with the usual ring gear (not shown) upon the front wheel of the vehicle. The second shaft 12 has a slot 13 for connection to the usual flexible driving shaft of the speedometer. The unitary housing 14 is provided with hollow cylindrical portions 20—22 angularly inclined to one another and each of which is provided with an open end 23 adapted to be closed by the end bearing 25 in which the ends of the shafts are journaled. These end bearings are secured in place by a drive fit in the open ends of the housing to form a rigid construction. One of the end bearings is provided with a grease cup 24. Upon each of the shafts 10 and 12 and within the housing 14, the worm 26 and the spiral gear 28 are secured. These gears are designed with respect to the angular inclination of the two shafts 10 and 12 to secure a rotation of the pinion and its shaft in one direction to produce a rotation of the shaft 12 in the same direction. In this manner the desired directional relation between the rotation of the two shafts is secured by the use of a single pair of gears, thus enabling the construction of the entire driving joint to be simple and extremely rigid. The construction of the housing is such as to enable the joint to be assembled in a convenient and simple manner, the worm gears being slipped through the open ends 23 into the interior of the housing. The worm gear 26 is a right hand four thread worm, and the worm gear 28 is a right hand ten thread worm. Obviously, therefore, the worm 26 is comparatively a slow traverse worm with respect to the worm or spiral gear 28, and the result of this is that the connection is irreversible from the speedometer end. Thus while the gear 26 may be rotated in either direction to drive the driven gear 28, the latter has such tooth angle with relation to the driving worm 26 that is cannot turn the latter. This driving joint is rigid, durable and of construction facilitating easy assembly. Thus the tubular member 15 is forced into the mouth of the housing 14 and secured in place by such driving fit. The shaft 10 of the driving worm 26 is dropped into the bearing in the tubular member, and then the closure 25 or end bearing is forced into place in the opposite opening of the housing. This closure is provided with an opening, and a grease cup affords means for introducing lubricant to the worms. Then the shaft and the other gear are simply dropped into place and the closure is forced in the other opening, and thus the device is permanently assembled and the parts are always maintained in good working relation.

Having thus described the invention, what is claimed is:

1. A driving joint for speedometers comprising a housing having two holes therethrough arranged at an angle of approximately 120° with respect to each other and at a distance from each other, two shafts supported in the holes in the housing, the first being provided with a relatively slow traverse worm or spiral gear, the other being provided with a relatively quick traverse worm or spiral gear, both gears having the same kind of thread or teeth, the first shaft being adapted to be driven by the vehicle, and the second shaft being adapted for connection with the driving shaft of the speedometer, the angular arrangement of the worm threads or spiral gear teeth being such that both shafts rotate in the same direction by the application of power to the first shaft, whereby speed reduction is secured between the first shaft and the second shaft.

2. A driving joint for speedometers comprising a housing having two holes therethrough, a tubular member supported in one end of one hole and constituting a bearing, a shaft mounted in said bearing provided with a slow traverse worm or gear, a second shaft mounted in the other hole in the housing provided with a quick traverse gear, the ends of the holes being closed by end bearings taking against the ends of the shafts, and forming end bearings for the shafts, the threads of both gears being right hand so that power applied to the first shaft rotates the second shaft in the same direction and because of their respective forms of traverse, at a reduced speed ratio.

3. A driving joint for speedometers comprising a housing provided with a hole therethrough of uniform diameter, a tubular member supported in one end of the hole and constituting a bearing, a driving shaft mounted in such bearing and provided with a slow traverse spiral gear supported in the hole, an end bearing closing the opposite end of the hole, said housing being provided with a second hole offset from the first hole and arranged at an angle of about 120° with relation thereto, said hole being enlarged opposite the gear on the first shaft, a driven shaft mounted in the reduced portion of the second hole, a quick traverse spiral gear mounted on said shaft and located in the enlarged portion of the hole, an end bearing closing such enlarged portion, the housing at the end of the reduced portion of such hole being provided with means for attachment to the casing of the speedometer driving shaft.

HENRY A. AMES.